(12) United States Patent
Gay et al.

(10) Patent No.: US 9,691,173 B2
(45) Date of Patent: *Jun. 27, 2017

(54) SYSTEM AND METHOD FOR RENDERING IN ACCORDANCE WITH LOCATION OF VIRTUAL OBJECTS IN REAL-TIME

(71) Applicant: Disney Enterprises, Inc., Burbank, CA (US)

(72) Inventors: Michael Gay, Collinsville, CT (US); Aaron Thiel, Durham, CT (US)

(73) Assignee: Disney Enterprises, Inc., Burbank, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 14/816,771

(22) Filed: Aug. 3, 2015

(65) Prior Publication Data

US 2015/0339842 A1    Nov. 26, 2015

Related U.S. Application Data

(63) Continuation of application No. 12/456,813, filed on Jun. 23, 2009, now Pat. No. 9,129,644.

(51) Int. Cl.
| | | |
|---|---|---|
| G06T 19/00 | (2011.01) | |
| G06T 15/00 | (2011.01) | |
| G06T 17/00 | (2006.01) | |
| G06F 3/0481 | (2013.01) | |
| G11B 27/036 | (2006.01) | |

(52) U.S. Cl.
CPC .......... *G06T 15/00* (2013.01); *G06F 3/04815* (2013.01); *G06T 17/00* (2013.01); *G06T 19/006* (2013.01); *G11B 27/036* (2013.01)

(58) Field of Classification Search
USPC ......... 345/419, 427, 632, 633, 473; 463/1, 4
See application file for complete search history.

(56) References Cited

U.S. PATENT DOCUMENTS

| | | | | |
|---|---|---|---|---|
| 7,043,695 | B2* | 5/2006 | Elber | ............ G06T 17/00 345/418 |
| 8,803,917 | B2* | 8/2014 | Meehan | ............ G06T 19/006 345/633 |
| 9,216,351 | B2* | 12/2015 | Herman | ............ A63F 13/10 |
| 2002/0158873 | A1* | 10/2002 | Williamson | ............ G06T 7/002 345/427 |
| 2004/0104935 | A1* | 6/2004 | Williamson | ............ G06F 3/012 715/757 |

(Continued)

*Primary Examiner* — Kimbinh T Nguyen
(74) *Attorney, Agent, or Firm* — Farjami & Farjami LLP

(57) ABSTRACT

There is provided a system and method for rendering in accordance with location of virtual objects in real-time. There is provided a method for persistent association of a graphic overlay with a virtual object in a displayable environment, comprising receiving a first three-dimensional coordinate of the virtual object in the displayable environment, determining a three-dimensional coordinate of the graphic overlay in accordance with the first three-dimensional coordinate of the virtual object, tracking a movement of the virtual object in the displayable environment by receiving one or more second three-dimensional coordinates of the virtual object, and modifying the three-dimensional coordinate of the graphic overlay in accordance with the one or more second three-dimensional coordinates of the virtual object.

20 Claims, 4 Drawing Sheets

(56) References Cited

U.S. PATENT DOCUMENTS

| | | | |
|---|---|---|---|
| 2004/0248631 A1* | 12/2004 | Hirai | A63F 13/10 463/4 |
| 2007/0146372 A1* | 6/2007 | Gee | G06T 13/00 345/474 |
| 2009/0051682 A1* | 2/2009 | Lonsing | G06T 15/00 345/419 |
| 2009/0059007 A1* | 3/2009 | Wagg | G06K 9/00369 348/157 |
| 2009/0221368 A1* | 9/2009 | Yen | A63F 13/10 463/32 |

* cited by examiner

SYSTEM AND METHOD FOR RENDERING IN ACCORDANCE WITH LOCATION OF VIRTUAL OBJECTS IN REAL-TIME

This application is a Continuation of U.S. patent application Ser. No. 12/456,813, filed Jun. 23, 2009.

BACKGROUND OF THE INVENTION

1. Field of the Invention

The present invention relates generally to digital video. More particularly, the present invention relates to rendering digital video rendering.

2. Background Art

Sports are widely watched and enjoyed by many people, from dedicated sports fans to casual spectators. While just watching the game or match by itself is already exciting, the addition of supplemental commentary, statistics, analysis, and visuals may deepen viewer appreciation of the techniques and strategies used by the sports players. Viewers can keep tabs on the running statistics of their favorite players, view simulations of various potential game plans, and learn about the planning and strategy involved in past replays. In this manner, new spectators can quickly get up to speed on game rules and common scenarios, whereas seasoned fans can deepen their knowledge of specific strategies and detailed statistics.

Some examples of such supplemental content may include statistics marquees, player profile screens, and other information. However, much of this supplemental content is traditionally presented either on a reserved static portion of the screen or on a separate screen. Separate screens may distract viewers from primary footage of the game, whereas static locations might be difficult for viewers to read and focus. Both situations are less than ideal. On the other hand, placing such supplemental content on a more flexible, dynamically locatable overlay traditionally requires manual path adjustment to avoid interfering and obscuring other onscreen objects, a potentially time consuming and error prone process.

Accordingly, there is a need to overcome the drawbacks and deficiencies in the art by providing a way to present dynamically moving overlays without requiring manual positioning adjustments.

SUMMARY OF THE INVENTION

There are provided systems and methods for rendering in accordance with location of virtual objects in real-time, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present application is directed to a system and method for rendering in accordance with location of virtual objects in real-time. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
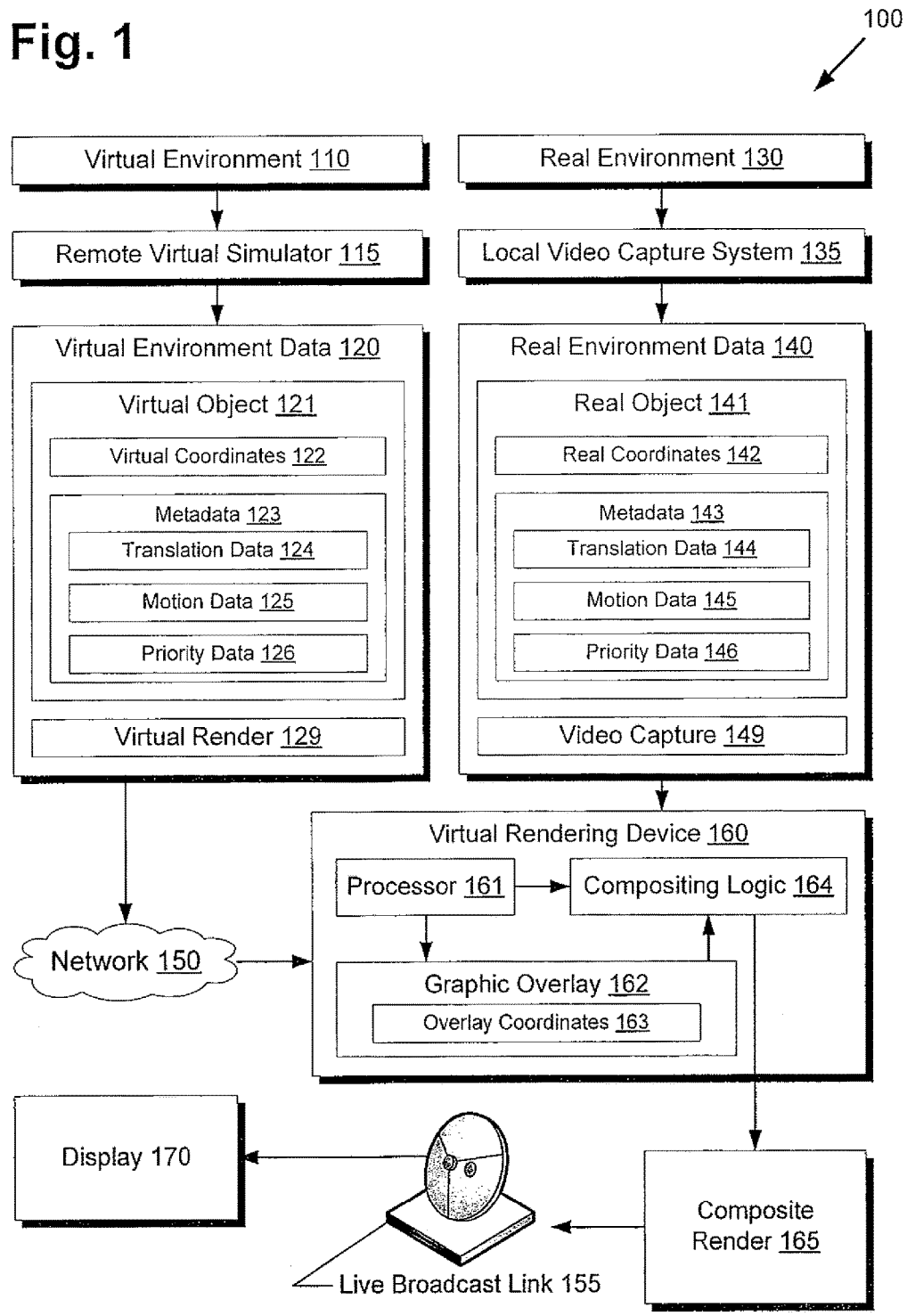
FIG. 1 presents a system for rendering in accordance with location of virtual objects in real-time, according to one embodiment of the present invention.

FIG. 1 presents a system for rendering in accordance with location of virtual objects in real-time, according to one embodiment of the present invention. Environment 100 of FIG. 1 includes virtual environment 100, remote virtual simulator 115, virtual environment data 120, real environment 130, local video capture system 135, real environment data 140, network 150, live broadcast link 155, virtual rendering device 160, composite render 165, and display 170. Virtual environment data 120 includes virtual object 121 and virtual render 129. Virtual object 121 includes virtual coordinates 122 and metadata 123. Metadata 123 includes translation data 124, motion data 125, and priority data 126. Real environment data 140 includes real object 141 and video capture 149. Real object 141 includes real coordinates 142 and metadata 143. Metadata 143 includes translation data 144, motion data 145, and priority data 146. Virtual rendering device 160 includes processor 161, graphic overlay 162, and compositing logic 164. Graphic overlay 162 includes overlay coordinates 163.

Virtual environment 110 may represent a virtual three-dimensional world and may include various data such as world settings, three-dimensional models and objects, textures, behaviors, properties, and other data. Remote virtual simulator 115 may then process virtual environment 110 to provide a virtual simulation. Remote virtual simulator 115 may comprise, for example, a personal computer using standard off-the-shelf components, or a videogame console. Remote virtual simulator 115 may then execute a customized simulation program for simulating virtual environment 110 according to solicited input parameters. For example, the input parameters may be provided by a keyboard, mouse, or game-pad connected directly to remote virtual simulator 115, or relayed over network 150.

While remote virtual simulator 115 is simulating virtual environment 110, virtual rendering device 160 may request a one-time or continuously updated data feed from remote virtual simulator 115 through network 15 regarding specific or comprehensive aspects of the simulation. As shown in FIG. 1, this data feed is captured as virtual environment data 120, including virtual object 121 and virtual render 129. Although FIG. 1 presents remote virtual simulator 115 as a remotely accessible resource from network 150, alternative embodiments may have utilize a locally accessible virtual simulator connected to virtual rendering device 160 without using network 150, or the functions of remote virtual simulator 115 might be incorporated as part of virtual rendering device 160 itself.

Virtual object 121 may contain data describing a virtual object within virtual environment 110, including the position of the virtual object within virtual three-dimensional space, or virtual coordinates 122, and other data contained in metadata 123. Metadata 123 includes translation data 124, which may include any scaling, rotation, and orientation data relevant for the virtual object, motion data 125, which may include, for example, directional vectors in three-dimensional space or projected trajectories, and priority data 126, which may resolve whether the virtual object should be visible depending on the priorities of other objects.

Although only a single virtual object 121 is present within virtual environment data 120, alternative embodiments may include several virtual objects, or even all the virtual objects from virtual environment 110. Additionally, the elements presented within virtual object 121 are merely exemplary, and other embodiments may include additional or alternative data sets. For example, metadata 123 may include additional components, such as statistics, history, previous simulation records, and pointers to external data.

Virtual render 129 may comprise, for example, a rendered visual representation of the simulation, suitable for outputting to a display such as display 170. Although virtual render 129 is shown as provided by remote virtual simulator 115 in FIG. 1, alternative embodiments may use virtual rendering device 160 instead to recreate virtual render 129 from virtual environment data 120.

Real environment 130 may comprise a real location to be captured by local video capture system 135, such as a sports stadium, playing field, indoor court, outdoor field, or another locale. Objects to be tracked in real environment 130 such as people, boundaries, balls, and other objects may be tracked with some form of location tracking system such as a location tracking system using radio frequency identification (RFID) tags. Objects to be tracked may be moving or static. This location tracking system may be integrated as part of local video capture system 135.

As with virtual environment data 120, virtual rendering device 160 may request a one-time or continuous data feed for real environment 130, which is provided by real environment data 140. Real object 141 may include location and other data concerning an object within real environment 130. Real coordinates 142 may track the position of real object 141 within the three-dimensional space of real environment 130. Metadata 143 may further contain other data regarding real object 141, such as translation data 141 regarding rotation and orientation of the object, motion data 145 including direction vectors or trajectories, and priority data 146 providing visibility rules for interferences with other objects. Video capture 149 may comprise a real-time video feed of real environment 130 provided by video cameras of local video capture system 135. Although in FIG. 1, virtual rendering device 160 accesses real environment data 140 directly through local video capture system 135, alternative embodiments may access real environment data 140 through a network source accessible from network 150.

Virtual rendering device 160 may comprise a general purpose processing system executing custom software, or a special purpose hardware unit, and includes a memory (not shown) for storage of instructions and data for the operation of virtual rendering device 160. Once processor 161 establishes data feeds for virtual environment data 120 and real environment data 140, it may utilize compositing logical 164 and graphical overlay 162 to generate composite render 165. Graphic overlay 162 may include, for example, text windows, marquees, diagrams, arrows, telestration markings, and other information of interest. Since remote virtual simulator 115 provides virtual coordinates 122, overlay coordinates 163 can follow the path of virtual object 121 as the simulation progresses. Similarly, real coordinates 142 can also be used to reposition overlay coordinates 163 in real-time.

Moreover, by utilizing the data provided in virtual environment data 120 and real environment data 140, processor 161 can automatically ensure that overlay coordinates 163 are selected to avoid unwanted interferences with real or virtual objects from real environment 130 and virtual environment 110. Priority rules can also specify whether virtual or real objects should display first, and in which order. In this manner, graphic overlay 162 can appear to follow a virtual or real object while concurrently avoiding collisions or interferences with other displayed objects. Since processor 161 handles the calculation of overlay coordinates 163, mistakes resulting from manual repositioning can be avoided, and more accurate tracking can be provided, even in real-time. Since graphic overlay 162 may use data from dynamic data sources such as databases, processor 161 may also generate the image portion of graphic overlay 162 in real-time from internal or external data sources.

Once graphic overlay 162, including overlay coordinates 163, is generated, processor 161 may apply compositing logic 164 to combine virtual render 129, video capture 149, and graphic overlay 162 as composite render 165. Compositing logic 164 may contain rules and other algorithms for deciding how to combine real, virtual, and overlay elements within a single frame. Composite render 165 can then be sent via live broadcast link 155 to be shown on display 170. Live broadcast link 155 may comprise, for example, a satellite uplink to a television studio, from where it is disseminated to the general public. Display 170 may then represent, for example, a television of a viewer watching a live sports program.

In this manner, broadcasts combining live footage with virtual environments may be presented to viewers, opening up new possibilities for sports analysis, scenario enactments, strategy presentations, and other augmented reality applications. Additionally, with graphic overlays that intelligently follow virtual or real objects while automatically avoiding colliding with or obscuring other onscreen objects, viewers can be apprised of game statistics, player data and portraits, and other relevant and topical information in a dynamic manner, at onscreen positions most likely to engage the interest of viewers. Since there is no need for manual adjustment to optimally position the graphic overlays, human error and operator costs can be reduced or eliminated compared to traditional manual overlay positioning.

Figure 2:
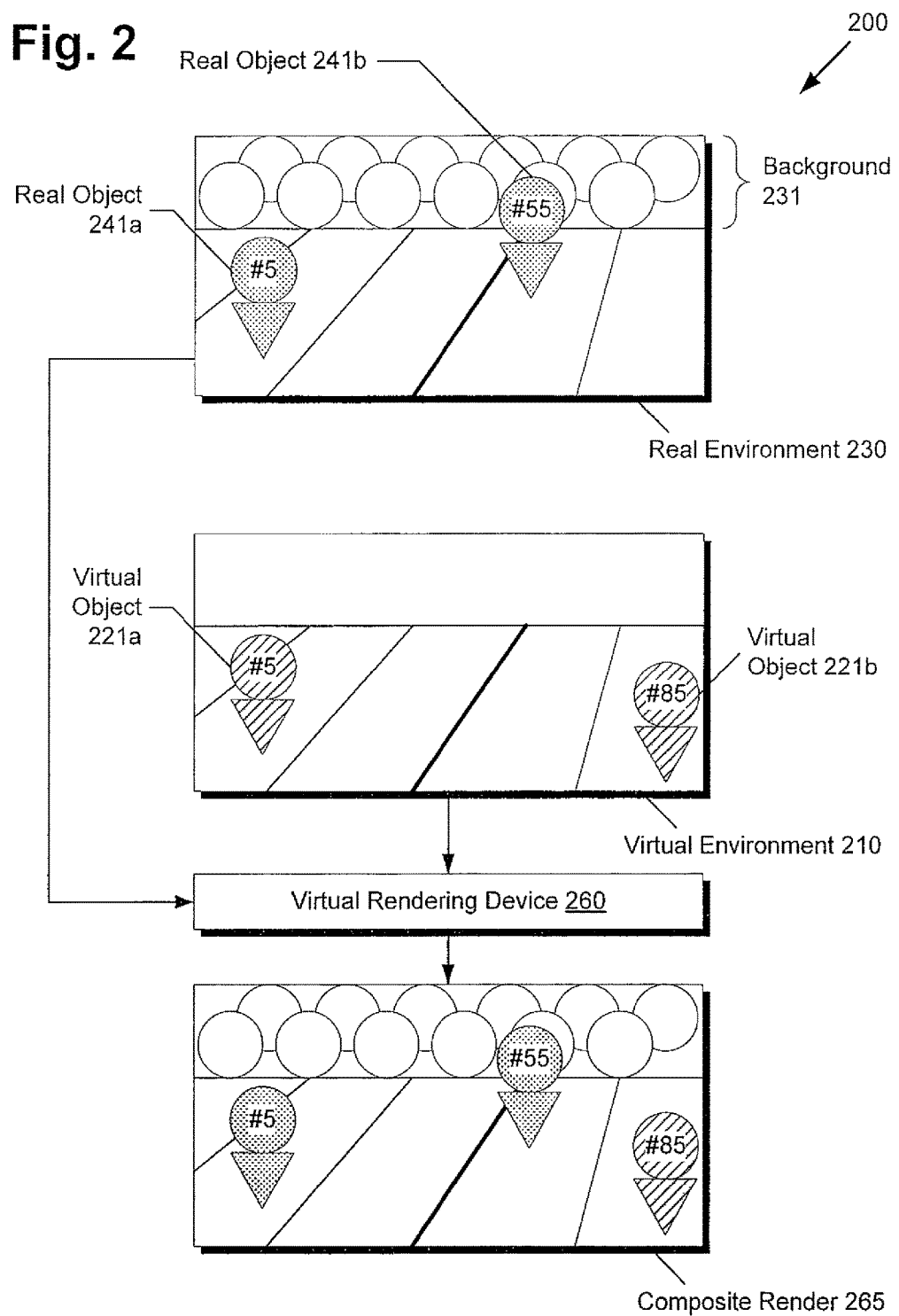
FIG. 2 presents a diagram of real and virtual environments for use by a system for rendering in accordance with location of virtual objects in real-time, according to one embodiment of the present invention.

FIG. 2 presents a diagram of real and virtual environments for use by a system for rendering in accordance with location of virtual objects in real-time, according to one embodiment of the present invention. Diagram 200 of FIG. 2 includes virtual environment 210, real environment 230, virtual rendering device 260, and composite render 265. Virtual environment 210 includes virtual objects 221a-221b. Real environment 230 includes real objects 241a-241b and background 231. With regards to FIG. 2, it should be noted that virtual environment 210 corresponds to virtual environment 110 from FIG. 1, that real environment 230 corresponds to real environment 130, that virtual rendering device 260 corresponds to virtual rendering device 160, and that composite render 265 corresponds to composite render 165.

Real environment 230 depicts a scene of a football field captured by video cameras. Background 231 shows the faces of spectators in the background, real object 241a shows a quarterback with the uniform number 5, and real object 241b shows a linebacker with the uniform number 55. The positions of real objects 241a-241b might be tracked through RFID tags attached to player uniforms, as previously discussed.

Virtual environment 210 corresponds to a virtual version of the football field captured by real environment 230. Virtual object 221a corresponds to a virtual version of real object 241a, and virtual object 221b corresponds to a virtual version of a real object not shown in real environment 230, but may comprise a wide receiver with the uniform number 85.

As previously discussed, virtual rendering device 260 can combine data extracted from real environment 230 and virtual environment 210 to generate composite render 265, to form a kind of augmented reality broadcast mixing both real and virtual elements. As shown by composite render 265, real object 241a takes precedence over virtual object 221a. This may be a result of a global rule prioritizing real objects over virtual objects, or by specific priority rules associated with particular objects. Although a graphic overlay is not shown in composite render 265, virtual rendering device 260 may also insert a graphic overlay to provide additional information to viewers, discussed in conjunction with FIG. 3 below.

Figure 3:
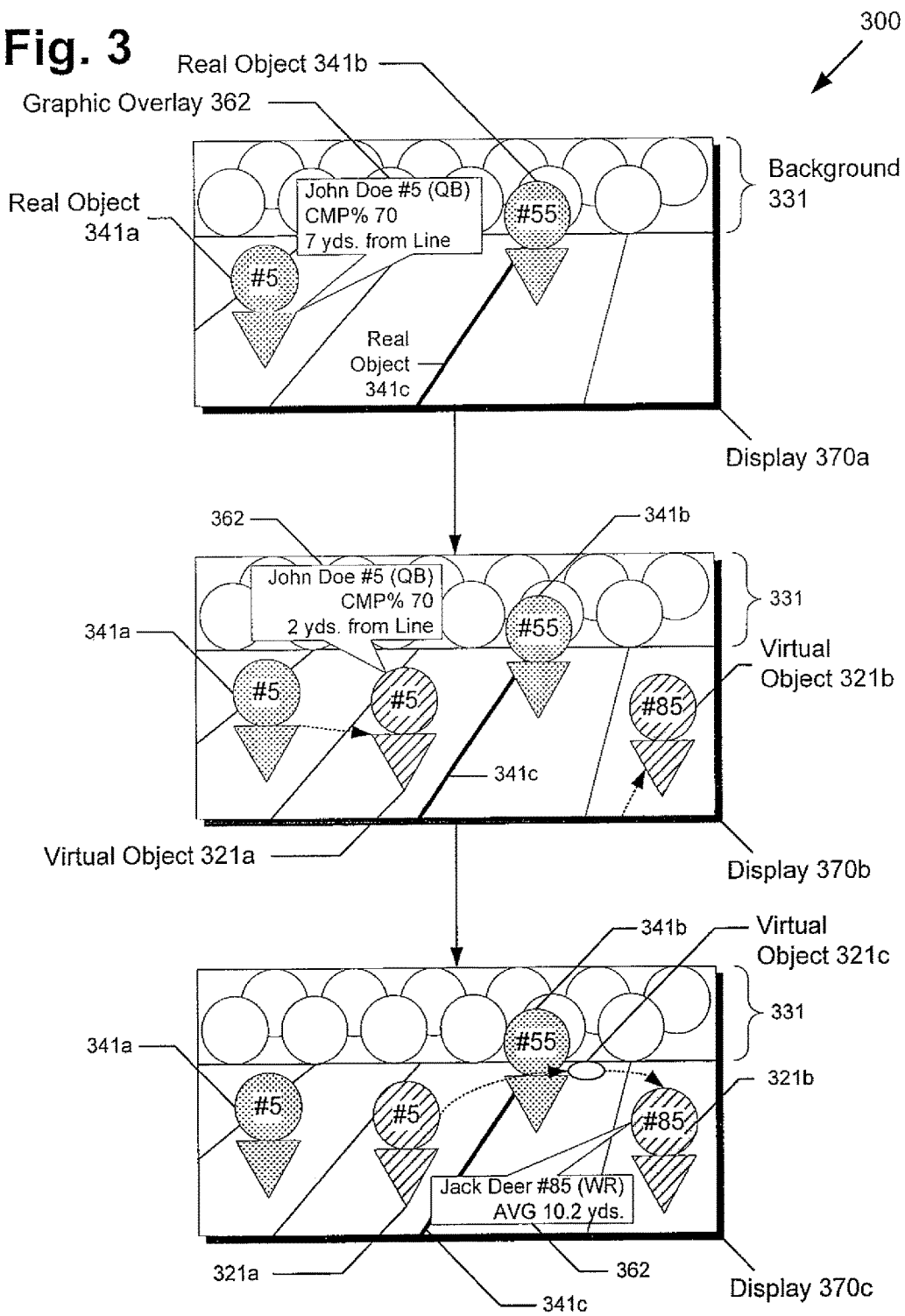
FIG. 3 presents a series of exemplary interfaces on a display using a system for rendering in accordance with location of virtual objects in real-time, according to one embodiment of the present invention.

FIG. 3 presents a series of exemplary interfaces on a display using a system for rendering in accordance with location of virtual objects in real-time, according to one embodiment of the present invention. Diagram 300 of FIG. 3 includes displays 370a-370c. Display 370a includes background 331, real objects 341a-341c, and graphic overlay 362. Display 370b includes virtual object 321a-321b, background 331, real objects 341a-341c, and graphic overlay 362. Display 370c includes virtual objects 321a-321c, background 331, real objects 341a-341c, and graphic overlay 362. With regards to FIG. 3, it should be noted that displays 370a-370c correspond to display 170 from FIG. 1.

Display 370a shows an arrangement similar to real environment 230 of FIG. 2, with the addition of graphic overlay 362 and the line of scrimmage marked as real object 341c. As shown by graphic overlay 362, a text window displaying data regarding real object 341a is shown to viewers, including the name of the player or "John Doe," the uniform number or #5 quarterback, the completion percentage or 70%, and the distance of the player from the line of scrimmage as real object 341c, or 7 yards. As shown in display 370a, graphic overlay 362 is positioned adjacent to the right of real object 341

Moving down to display 370b, which may represent a state at a later time, virtual objects 321a-321b are introduced, distinguishable from real objects by crossed line shading. In an actual rendering, virtual object 321a might be rendered as a realistic three-dimensional model as used in videogames and computer generated (CG) animations. The arrow pointing from real object 341a to virtual object 321a may represent a simulated movement path for John Doe, and may also be shown onscreen to provide a visual indicator for viewers.

Furthermore, graphic overlay 362 may track the position of virtual object 321a as it moves across display 370b, using coordinates provided by both real and virtual environments comprising display 370b. Moreover, as shown in display 370b, graphic overlay 362 is positioned above virtual object 321a such that it does not obscure real objects 341a-341b. This may be implemented by, for example, a global rule prioritizing the display of real objects corresponding to players to prevent graphic overlays from obscuring the position of the players. Since background 331 is not a player, it might be given a low priority, thereby allowing graphic overlay 362 to overlap background 331.

Moving to a later time at display 370c, the simulation further has the virtual version of John Doe throwing a virtual football represented by virtual object 321c to Jack Deer represented by virtual object 321b. Since the focus of the simulation has moved from John Doe throwing a pass to Jack Deer receiving the pass, the focus of graphic overlay 362 may migrate to virtual object 321b representing Jack Deer. Thus, as shown in display 370c, the text window now provides information regarding virtual object 321b, including the name of the player, "Jack Deer," the number of his uniform, number 85 wide receiver, and his average reception distance, or 10.2 yards. Again, using priority rules as discussed above, the position of graphic overlay 362 may be adjusted such that it does not interfere with other onscreen objects, providing relevant information at the most convenient location without obscuring the action onscreen.

Of course, graphic overlay 362 is not limited to tracking players or their virtual representations, and could also track, for example, the football, or virtual object 321c, while in flight, relaying statistics such as speed, spin, and distance until the next down or from the line of scrimmage as real object 341c. Graphic overlay 362 might also provide information for static objects such as lines and boundaries. Moreover, although only a single graphic overlay 362 has been utilized so far, multiple graphic overlays could also be used to track multiple objects within a display. In this manner, potential play strategies and other useful and interesting commentary can be provided even in real-time, with the previously discussed automatic graphic overlay positioning mechanism largely removing any risk of covering up important real game footage or important virtual objects.

Figure 4:
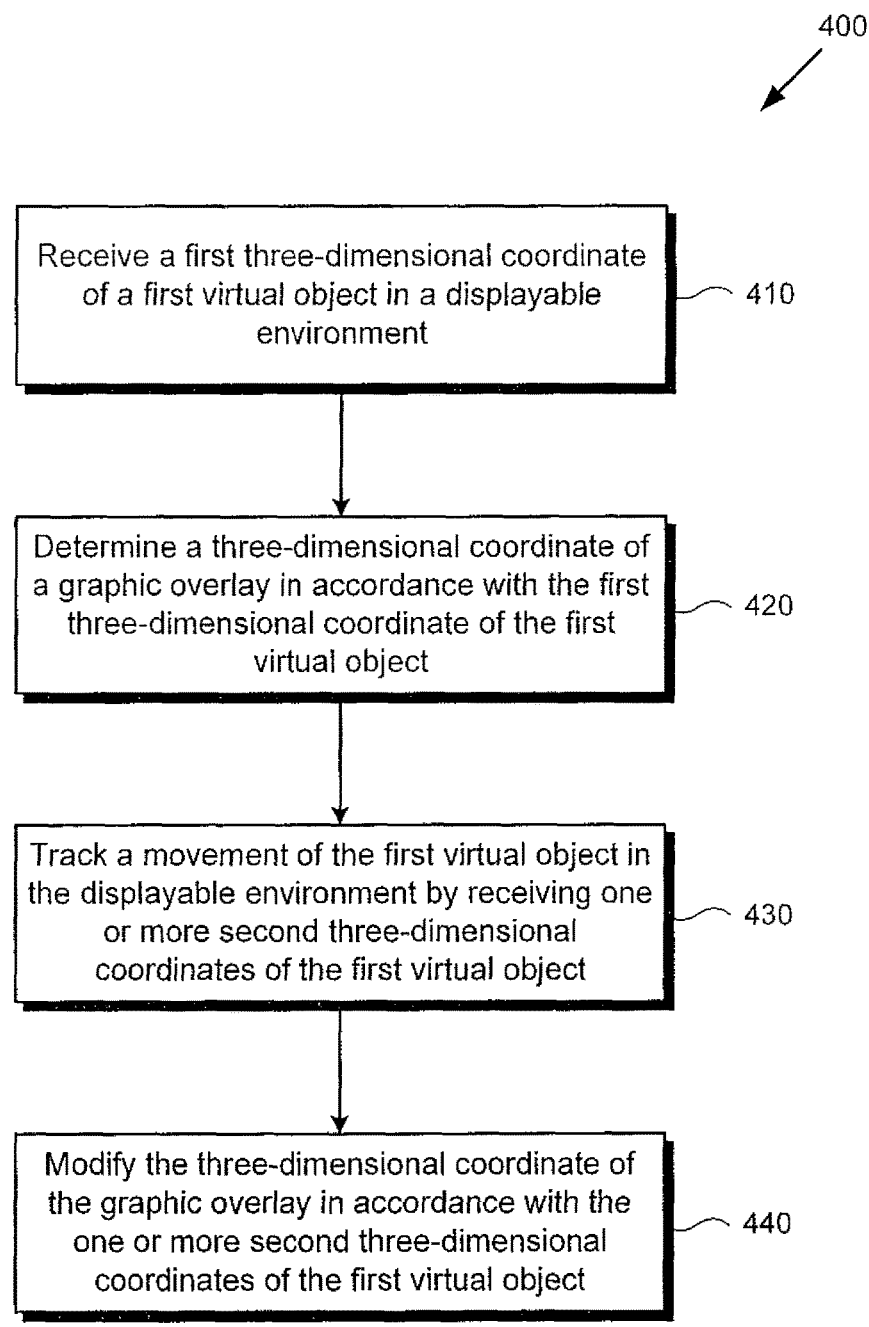
FIG. 4 shows a flowchart describing the steps, according to one embodiment of the present invention, by which a rendering device can render in accordance with location of virtual objects in real-time.

FIG. 4 shows a flowchart describing the steps, according to one embodiment of the present invention, by which a rendering device can render in accordance with location of virtual objects in real-time. Certain details and features have been left out of flowchart 400 that are apparent to a person of ordinary skill in the art. For example, a step may comprise one or more substeps or may involve specialized equipment or materials, as known in the art. While steps 410 through 440 indicated in flowchart 400 are sufficient to describe one embodiment of the present invention, other embodiments of the invention may utilize steps different from those shown in flowchart 400.

Referring to step 410 of flowchart 400 in FIG. 4 and environment 100 of FIG. 1, step 410 of flowchart 400 comprises virtual rendering device 160 receiving virtual coordinates 122 of virtual object 121 in virtual environment 110. As previously discussed, this may be accomplished through access via network 150 as shown in FIG. 1, or by a direct connection to remote virtual simulator 115, or by integrating remote virtual simulator 115 with virtual rendering device 160.

Referring to step 420 of flowchart 400 in FIG. 4 and environment 100 of FIG. 1, step 420 of flowchart 400 comprises virtual rendering device 160 determining overlay coordinates 163 in accordance with virtual coordinates 122 of virtual object 121 obtained from step 410. For example, processor 161 may apply a rule to position graphic overlay 162 directly adjacent to virtual object 121, with a relative direction depending on the position of virtual object 121 when rendered onto a display. A less complicated rule such as placing directly adjacent below might be used as well. Either way, virtual coordinates 122 are used in some manner to derive overlay coordinates 163.

Referring to step 430 of flowchart 400 in FIG. 4 and environment 100 of FIG. 1, step 430 of flowchart 400 comprises virtual rendering device 160 tracking a movement of virtual object 121 in virtual environment 110 by receiving one or more three-dimensional coordinates of virtual object 121. In step 430, virtual rendering device 160 continues to read a data feed of virtual environment data 120 where virtual coordinates 122 of virtual object 121 are updated according to a running simulation at remote virtual simulator 115. For example, examining diagram 300 of FIG. 3, if virtual object 121 corresponds to virtual object 321a depicting a simulated movement of real object 341a, then between a time period from displays 370a to 370b, step 430 may have processor 161 of virtual rendering device 160 receiving a series of updated coordinates for virtual coordinates 122 reflecting the movement of virtual object 321a as shown by the arrow in display 370b. These updates might be provided at a rate equal to or higher than the framerate of live broadcast link 155 to display 170, or interpolation might be used to estimate positions between updates.

Referring to step 440 of flowchart 400 in FIG. 4 and environment 100 of FIG. 1, step 440 of flowchart 400 comprises virtual rendering device 160 modifying overlay coordinates 163 of graphic overlay 162 determined from step 420 in accordance with the one or more three-dimensional coordinates of virtual object 121 tracked from step 430. As previously discussed, the positioning of overlay coordinates 163 relative to virtual coordinates 122 might be defined by an advanced rule taking into account the position of virtual coordinates 122 as projected onto display 170, or a simpler rule always selecting an adjacent location offset from a single directional vector. In either case, the relationship between overlay coordinates 163 and virtual coordinates 122 should be such that their correspondence is clearly visible when associated with a virtual object and a graphic overlay on display 170.

Furthermore, as previously discussed, virtual rendering device 160 may apply various priority rules and other mechanisms for avoiding overlap and collision with other objects onscreen that may clutter display 170 and present a less than ideal overview of virtual environment 110 and real environment 130. As previously discussed, one example might be to prioritize the display of real players, so that graphic overlays never obscure the position of the players on the field, which may be very important for watching a game in progress. Since processor 161 is able to accomplish this positioning automatically with the help of compositing logic 164 and data feeds provided by virtual environment data 120 and real environment data 140, image overlays can now be readily rendered in accordance to the location of virtual objects in real-time, providing new and exciting ways of presenting valuable and relevant information to viewers in real-time at optimal positions onscreen without the need for error prone manual placements and adjustments.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for association of a graphic overlay with a first object in a displayable environment, the method comprising:
   receiving a first three-dimensional coordinate of the first object in the displayable environment;
   determining a three-dimensional coordinate of the graphic overlay in accordance with the first three-dimensional coordinate of the first object, wherein the determining the three-dimensional coordinate of the graphic overlay applies positional rules so that the graphic overlay does not obscure both the first object and one or more other objects in the displayable environment;
   tracking a movement of the first object in the displayable environment by receiving one or more second three-dimensional coordinates of the first object;
   modifying the three-dimensional coordinate of the graphic overlay in accordance with the one or more second three-dimensional coordinates of the first object, wherein modifying the three-dimensional coordinate of the graphic overlay includes repositioning the graphic overlay to avoid obscuring the first object and the one or more other objects in the displayable environment; and
   rendering the graphic overlay and the displayable environment for displaying on a display.

2. The method of claim 1, wherein the first object is a real object.

3. The method of claim 2, wherein the first object is tracked using a location tracking system.

4. The method of claim 3, wherein the location tracking system uses a radio frequency identification associated with the first object.

5. The method of claim 2, wherein the first object is a player in a game.

6. The method of claim 2, wherein the first object is a ball in a game.

7. The method of claim 1, wherein the first object is tracked to determine one or more of a speed of the first object, a spin of the first object and a distance of the first object from a location.

8. The method of claim 1, wherein the first object is a virtual object.

9. The method of claim 1, wherein the modifying of the three-dimensional coordinate of the graphic overlay uses priority data providing visibility rules for the first object and the one or more other objects.

10. The method of claim 1, wherein the graphic overlay includes one or more of text windows, marquees, diagrams, arrows and telestration markings.

11. A rendering device for rendering a displayable environment with association of a graphic overlay with a first virtual object, the rendering device comprising:

a processor configured to:
   receive a first three-dimensional coordinate of the first object in the displayable environment;
   determine a three-dimensional coordinate of the graphic overlay in accordance with the first three-dimensional coordinate of the first object, wherein the determining the three-dimensional coordinate of the graphic overlay applies positional rules so that the graphic overlay does not obscure both the first object and one or more other objects in the displayable environment;
   track a movement of the first object in the displayable environment by receiving one or more second three-dimensional coordinates of the first object;
   modify the three-dimensional coordinate of the graphic overlay in accordance with the one or more second three-dimensional coordinates of the first object, wherein modifying the three-dimensional coordinate of the graphic overlay includes repositioning the graphic overlay to avoid obscuring the first object and the one or more other objects in the displayable environment; and
   render the graphic overlay and the displayable environment for displaying on a display.

12. The rendering device of claim 11, wherein the first object is a real object.

13. The rendering device of claim 12, wherein the first object is tracked using a location tracking system.

14. The rendering device of claim 13, wherein the location tracking system uses a radio frequency identification associated with the first object.

15. The rendering device of claim 12, wherein the first object is a player in a game.

16. The rendering device of claim 12, wherein the first object is a ball in a game.

17. The rendering device of claim 11, wherein the first object is tracked to determine one or more of a speed of the first object, a spin of the first object and a distance of the first object from a location.

18. The rendering device of claim 11, wherein the first object is a virtual object.

19. The rendering device of claim 11, wherein the modifying of the three-dimensional coordinate of the graphic overlay uses priority data providing visibility rules for the first object and the one or more other objects.

20. The rendering device of claim 11, wherein the graphic overlay includes one or more of text windows, marquees, diagrams, arrows and telestration markings.

* * * * *